United States Patent
Tichborne et al.

(10) Patent No.: US 10,086,222 B2
(45) Date of Patent: Oct. 2, 2018

(54) CONDITIONING SYSTEM FOR FUEL CELL EXHAUST

(71) Applicant: AIRBUS OPERATIONS LIMITED, Bristol (GB)

(72) Inventors: Franklin Tichborne, Bristol (GB); Joseph K-W Lam, Bristol (GB); Timothy Leigh, Bristol (GB); Brian Hughes, Belfast (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 990 days.

(21) Appl. No.: 14/385,604

(22) PCT Filed: Mar. 19, 2013

(86) PCT No.: PCT/GB2013/050702
§ 371 (c)(1),
(2) Date: Sep. 16, 2014

(87) PCT Pub. No.: WO2013/140152
PCT Pub. Date: Sep. 26, 2013

(65) Prior Publication Data
US 2015/0040986 A1    Feb. 12, 2015

(30) Foreign Application Priority Data
Mar. 21, 2012 (GB) .................................. 1204959.9

(51) Int. Cl.
*B64D 37/32* (2006.01)
*B64D 37/34* (2006.01)
(Continued)

(52) U.S. Cl.
CPC ................ *A62C 3/065* (2013.01); *A62C 3/08* (2013.01); *A62C 5/006* (2013.01);
(Continued)

(58) Field of Classification Search
CPC .............. B64D 37/32; B64D 2041/005; B64D 2013/0659; B64D 37/34
See application file for complete search history.

(56) References Cited

U.S. PATENT DOCUMENTS 3,158,197 A * 11/1964 Blezard .................. B64D 13/00
165/104.31
3,387,626 A * 6/1968 Morris ................... B64D 37/16
137/563
(Continued)

FOREIGN PATENT DOCUMENTS

DE   102005053694 B3   1/2007
DE   102009040013 A1   3/2011
(Continued)

OTHER PUBLICATIONS

International Search Report dated Jul. 5, 2013 in International Application No. PCT/GB13/050702, filed Mar. 19, 2013.
(Continued)

*Primary Examiner* — Richard R Green
(74) *Attorney, Agent, or Firm* — Hauptman Ham, LLP

(57) ABSTRACT

A method of conditioning oxygen depleted air (ODA) exhausted from a fuel cell comprising the steps of; taking fuel from an aircraft fuel tank collector cell, delivering said fuel to a rear mounted engine via a primary heat exchanger, taking exhaust ODA from a fuel cell, passing the ODA through the primary heat exchanger in the opposite direction to the fuel, such that the fuel acts as a heat sink for the ODA, to cool the ODA, passing the ODA through a dryer, to dry the ODA and using the cooled, dried ODA to inert fuel in the aircraft fuel tank.

12 Claims, 2 Drawing Sheets

Figure 1:
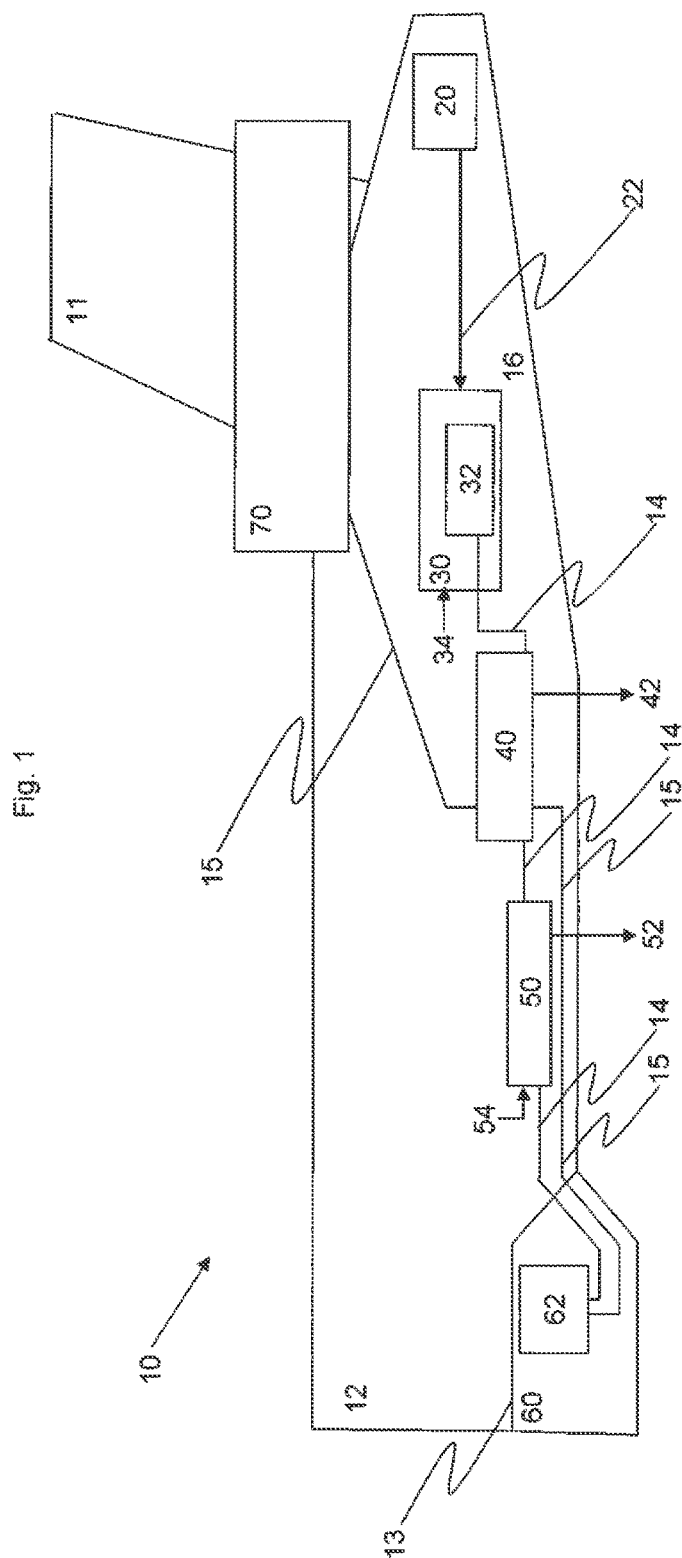

(51) Int. Cl.

| | | |
|---|---|---|
| *A62C 3/08* | (2006.01) | |
| *A62C 3/06* | (2006.01) | |
| *H01M 8/04014* | (2016.01) | |
| *A62C 5/00* | (2006.01) | |
| *A62C 99/00* | (2010.01) | |
| *H01M 8/04119* | (2016.01) | |
| *H01M 8/04082* | (2016.01) | |
| *B64D 41/00* | (2006.01) | |
| *B64D 13/06* | (2006.01) | |

(52) U.S. Cl.
CPC .......... *A62C 99/0018* (2013.01); *B64D 37/32* (2013.01); *H01M 8/04014* (2013.01); *H01M 8/04141* (2013.01); *H01M 8/04201* (2013.01); *B64D 37/34* (2013.01); *B64D 41/007* (2013.01); *B64D 2013/0659* (2013.01); *B64D 2041/005* (2013.01); *H01M 2250/20* (2013.01); *Y02T 90/32* (2013.01); *Y02T 90/36* (2013.01); *Y10T 137/0318* (2015.04); *Y10T 137/6579* (2015.04)

(56) References Cited

U.S. PATENT DOCUMENTS

| | | | | |
|---|---|---|---|---|
| 3,419,233 | A * | 12/1968 | Wotton | B64D 37/14 244/135 R |
| 3,982,399 | A * | 9/1976 | Rookey | B64D 37/32 137/255 |
| 6,315,815 | B1 * | 11/2001 | Spadaccini | B01D 19/0031 95/46 |
| 6,439,506 | B1 * | 8/2002 | Schlegel | B64D 37/02 137/202 |
| 7,152,635 | B2 * | 12/2006 | Moravec | B64D 37/32 141/64 |
| 7,815,148 | B2 * | 10/2010 | Kwok | A62C 99/0018 244/135 R |
| 8,042,343 | B2 * | 10/2011 | Jarlestal | B64D 13/00 244/118.5 |
| 8,172,182 | B2 * | 5/2012 | Tanner | B64C 3/34 244/135 B |
| 8,372,554 | B2 * | 2/2013 | Hoffjann | B64D 11/04 429/400 |
| 8,813,860 | B2 * | 8/2014 | Bleil | A62C 99/00 169/11 |
| 8,936,218 | B2 * | 1/2015 | Lam | B64C 3/34 244/135 R |
| 9,061,249 | B2 * | 6/2015 | Evosevich | B01D 67/0067 |
| 9,130,204 | B2 * | 9/2015 | Hoffjann | H01M 8/04156 |
| 9,567,094 | B2 * | 2/2017 | Tichborne | B64D 37/32 |
| 9,604,730 | B2 * | 3/2017 | Hagh | A62C 3/08 |
| 9,676,492 | B2 * | 6/2017 | Tichborne | B64D 37/32 |
| 2004/0112220 | A1 * | 6/2004 | Defrancesco | A62B 7/14 96/108 |
| 2004/0129835 | A1 * | 7/2004 | Atkey | B64D 13/06 244/118.5 |
| 2005/0241700 | A1 * | 11/2005 | Cozens | B64D 37/14 137/587 |
| 2006/0021652 | A1 * | 2/2006 | Surawski | B64D 37/32 137/209 |
| 2007/0108348 | A1 * | 5/2007 | Peters | B64D 37/32 244/135 R |
| 2007/0111060 | A1 * | 5/2007 | Hoffjann | B64D 37/32 429/414 |
| 2008/0070078 | A1 * | 3/2008 | Gummalla | B64D 41/00 429/410 |
| 2008/0187785 | A1 * | 8/2008 | Kwok | A62C 99/0018 244/10 |
| 2009/0226778 | A1 * | 9/2009 | Naeve | H01M 8/04089 429/445 |
| 2010/0028741 | A1 * | 2/2010 | Hoffjann | B64D 11/04 429/456 |
| 2012/0035406 | A1 * | 2/2012 | Lam | B64D 37/34 585/860 |
| 2012/0048413 | A1 * | 3/2012 | Lam | B64C 3/34 137/899.2 |
| 2012/0210747 | A1 * | 8/2012 | Hoffjann | H01M 8/04156 62/540 |
| 2012/0248251 | A1 * | 10/2012 | Tichborne | G01M 3/18 244/135 R |
| 2013/0078541 | A1 * | 3/2013 | Gummalla | B64D 41/00 429/410 |
| 2013/0320146 | A1 * | 12/2013 | Basset | B64D 37/06 244/135 C |
| 2014/0053726 | A1 * | 2/2014 | Evosevich | B01D 67/0067 95/54 |
| 2014/0238501 | A1 * | 8/2014 | Tichborne | B64D 37/32 137/12 |
| 2014/0325991 | A1 * | 11/2014 | Liew | B64D 41/00 60/785 |
| 2014/0349214 | A1 * | 11/2014 | Oehme | H01M 8/0662 429/513 |
| 2015/0017557 | A1 * | 1/2015 | Hoffjann | H01M 8/0662 429/410 |
| 2015/0048210 | A1 * | 2/2015 | Montgomery | B64D 37/32 244/135 R |
| 2015/0122814 | A1 * | 5/2015 | Tichborne | B64D 37/32 220/88.3 |
| 2015/0151845 | A1 * | 6/2015 | Jones | B64D 37/32 244/135 R |
| 2015/0217153 | A1 * | 8/2015 | Jones | A62C 3/08 169/62 |
| 2015/0353201 | A1 * | 12/2015 | Hagh | A62C 3/08 244/135 R |
| 2015/0360170 | A1 * | 12/2015 | Evosevich | B64D 37/32 95/54 |
| 2016/0051926 | A1 * | 2/2016 | Burnell | B01D 53/22 95/54 |
| 2016/0102261 | A1 * | 4/2016 | Lam | B64D 37/34 585/834 |
| 2016/0118679 | A1 * | 4/2016 | Joos | H01M 8/04559 429/415 |
| 2016/0200447 | A1 * | 7/2016 | Luedders | H01M 8/04761 244/129.2 |
| 2016/0297538 | A1 * | 10/2016 | Soriano | B64D 37/00 |
| 2017/0018792 | A1 * | 1/2017 | Buelte | H01M 8/1007 |
| 2017/0155162 | A1 * | 6/2017 | Zheng | H01M 8/0675 |

FOREIGN PATENT DOCUMENTS

| | | |
|---|---|---|
| EP | 1902954 A2 | 3/2008 |
| GB | 2442309 A | 4/2008 |
| WO | 2011036027 A1 | 3/2011 |

OTHER PUBLICATIONS

Written Opinion dated Jul. 5, 2013 in International Application No. PCT/GB13/050702, filed Mar. 19, 2013.
Search Report dated Jul. 2, 2012 in GB Application No. 1204959.9.

* cited by examiner

CONDITIONING SYSTEM FOR FUEL CELL EXHAUST

RELATED APPLICATIONS

The present application is a National Phase of International Application Number PCT/GB2013/050702, filed Mar. 19, 2013, and claims priority from Great Britain Application Number 1204959.9, filed Mar. 21, 2012.

The present invention relates to a conditioning system for a fuel cell exhaust and particularly to a method of cooling oxygen depleted air (ODA) exhausted from a fuel cell.

Certification authorities mandate that newly designed aircraft shall have ignition reduction means applied to their fuel tanks. In the industry this is commonly known as inerting. Inerting is typically implemented by filling the fuel tanks with Oxygen Depleted Air (ODA). (For civil aircraft the depletion is mandated at <12% Oxygen by weight).

Known inerting solutions include the use of Air Separation Modules, which are molecular sieves enabling air to have most of its Oxygen filtered off and discarded, leaving Nitrogen Enriched Air (NEA) to be used for inerting (ODA and NEA are essentially the same thing).

Civil aircraft commonly include an auxiliary power unit to supply electricity for ground and emergency use. Future civil aircraft may use a hydrogen fuel cell to provide auxiliary power. In a hydrogen fuel cell, hydrogen is catalysed with oxygen, producing electrical power and a by-product of water and ODA, in the form of hot humid gas.

Given the humidity of the ODA, using it to inert the fuel tanks directly is not typically suitable as it would add too much water to the fuel. The ODA must be dried.

Known methods for drying hot humid gases include the use of a dryer known as an enthalpy wheel. Enthalpy wheels consist broadly of a cylinder containing a rotating drum of desiccant hollow fibres lined axially. Two-thirds of these fibres in the rotation arc are exposed to the wet ODA to absorb the water vapour and one-third are exposed to hot purge drying air flowing in the other direction to remove that absorbed water. In this way a continuous stream of dried ODA is produced and the wet purged air is discarded.

However enthalpy wheels have an optimum operating temperature of approximately 0 to 12 degrees Celsius. Attempts to dry gases with enthalpy wheels at temperatures in excess of this are relatively ineffective. Given that ODA exhausts from the fuel cell in temperatures commonly in the range of 80 to 90 degrees Celsius, it is preferred that the ODA is cooled before passing to the enthalpy wheel.

Further known methods for drying hot humid gases include the use of drying modules, for example dual desiccant drying modules, with changeover valves directing the drying and regeneration cycles.

The operating temperature range of dual dessicant drying modules extends to higher temperatures but at the cost of a greater module weight.

Known methods for cooling hot humid gases include the use of loft radiators, which are heat exchangers embedded in an aircraft's skin.

However, when aircraft land and are held in hot locations, where the ambient temperature can be in excess of 40 degrees Celsius, the loft radiators are insufficient to cool the hot, humid ODA to the optimum operating temperature of the dryer.

Alternatively, if the aircraft originated or flew through very cold ambient environments en-route then the water vapour in the inerting ODA produced in those conditions may condense into the fuel and/or form ice crystals in the fuel tanks. This can be a hazard if those ice crystals reach fuel filters in the engines by coalescing and restricting the fuel flow.

Known methods to condition ODA or NEA include using active refrigeration, however this is commonly heavy, bulky and power consuming.

The present invention seeks to overcome these problems. It is an object of the present invention to provide an improved method of conditioning oxygen depleted air.

According to the first aspect of the present invention there is provided a method of conditioning oxygen depleted air (ODA) exhausted from a fuel cell comprising the steps of taking fuel from an aircraft fuel tank collector cell, delivering said fuel to a rear mounted engine via a primary heat exchanger, taking exhaust ODA from a fuel cell, passing the ODA through the primary heat exchanger in the opposite direction to the fuel, such that the fuel acts as a heat sink for the ODA, to cool the ODA, passing the ODA through a dryer, to dry the ODA and using the cooled, dried ODA to inert the fuel in the aircraft fuel tank.

The system thus uses the fuel to cool and condense the wet ODA as a part of the drying process. By cooling the ODA in the primary heat exchanger, before passing the ODA through the dryer, more efficient dying of the ODA may take place. The arrangement allows for space-efficient installation of the conditioning system for a standard rear-engined aircraft. When the fuel is cold then very efficient cooling of the ODA can be achieved.

In a preferred embodiment the method includes the step of, upon taking exhaust ODA from the fuel cell, passing the exhaust ODA through a secondary heat exchanger, to cool the ODA, before passing the ODA to the primary heat exchanger.

This arrangement means that when certain conditions allow, efficient pre-cooling of the ODA can be achieved.

According to the second aspect of the present invention there is provided a method of conditioning oxygen depleted air (ODA) exhausted from a fuel cell comprising the steps of taking exhaust ODA from a fuel cell, passing the ODA through a primary heat exchanger, the primary heat exchanger being located in a collector cell of an aircraft fuel tank, wherein the primary heat exchanger is a condenser, wherein the ODA passes through the fuel in the collector cell to remove any water, and using the cooled, dried ODA to inert the fuel in the aircraft fuel tank.

Aircraft with under-wing mounted engines require a different approach for efficient installation. In bubbling the ODA through the fuel in the collector cell, any water is transferred to the fuel and either stays as a suspended liquid, or coalesces at the bottom of the collector cell. In both cases the water is fed to the engines, in the case of fuel descending to the bottom of the tank it will be scavenged by jet pump suction devices powered by the fuel pump motive flow.

In a preferred embodiment of the second aspect, the method includes the step of, before passing the ODA through the primary heat exchanger, passing the ODA through a dryer, to dry the ODA.

In another preferred embodiment of the second aspect, the method includes the step of, upon taking exhaust ODA from the fuel cell, passing the exhaust ODA through a secondary heat exchanger, to cool the ODA.

This arrangement means that when certain conditions allow, efficient pre-cooling of the ODA can be achieved. By offering the second heat exchanger as a method of cooling the ODA before it is passed through the dryer, the ODA can be brought closer to the optimum temperature for drying in the dryer. In this case partially wet ODA would then be sent to a primary heat exchanger embedded in the fuel collector cell after passing through the dryer.

According to the third aspect of the present invention there is provided a conditioning system for cooling and drying wet oxygen depleted air (ODA) exhausted from a fuel cell to be used in inerting fuel within an aircraft fuel tank, said conditioning system comprising: a fuel cell, a collector cell in an aircraft fuel tank, an engine, and dryer and a primary heat exchanger, said primary heat exchanger being located between the collector cell in the aircraft fuel tank and the engine, a fuel line extending from the collector cell to the engine, passing through one side of the primary heat exchanger, an ODA line extending from the fuel cell to the fuel tank, passing through the other side of the primary heat exchanger so that fuel passing from the collector cell to the engine acts as a heat sink for the ODA, to cool the ODA, said dryer being located in the ODA line between the collector cell in the aircraft fuel tank and the primary heat exchanger, to dry the ODA.

In a preferred embodiment of the third aspect the conditioning system further comprises a secondary heat exchanger, said secondary heat exchanger comprising a loft radiator using atmospheric conditions.

According to the fourth aspect of the present invention there is provided a conditioning system for cooling and drying oxygen depleted air (ODA) exhausted from a fuel cell to be used in inerting fuel within an aircraft fuel tank, said conditioning system comprising; a fuel cell, a collector cell in the aircraft fuel tank, an under-wing mounted engine, a primary heat exchanger, said primary heat exchanger being a condenser, said primary heat exchanger being located in the collector cell in the aircraft fuel tank, said primary heat exchanger being supplied by ODA exhausted from the fuel cell, which is passed through the fuel in the collector cell, such that the aircraft fuel acts as a heat sink for the ODA, to cool the ODA.

In a preferred embodiment of the fourth aspect, the conditioning system further comprises a dryer.

In another preferred embodiment of the fourth aspect, the conditioning system further comprises a secondary heat exchanger, said secondary heat exchanger comprising a loft radiator using atmospheric conditions.

According to the fifth aspect of the present invention there is provided an aircraft having a fuel cell arranged to generate oxygen depleted air (ODA), a fuel tank with an inerting system, a conditioning system comprising a primary heat exchanger and a dryer, the primary heat exchanger using fuel from the fuel tank to cool the ODA and the dryer being configured to dry cooled ODA, the ODA used in inerting the fuel tank.

In a preferred embodiment of the fifth aspect at least one of the aircraft's engines is mounted at the rear of the aircraft.

In another preferred embodiment of the fifth aspect, at least one of the aircraft's engines is mounted under the wings of the aircraft.

Figure 2:
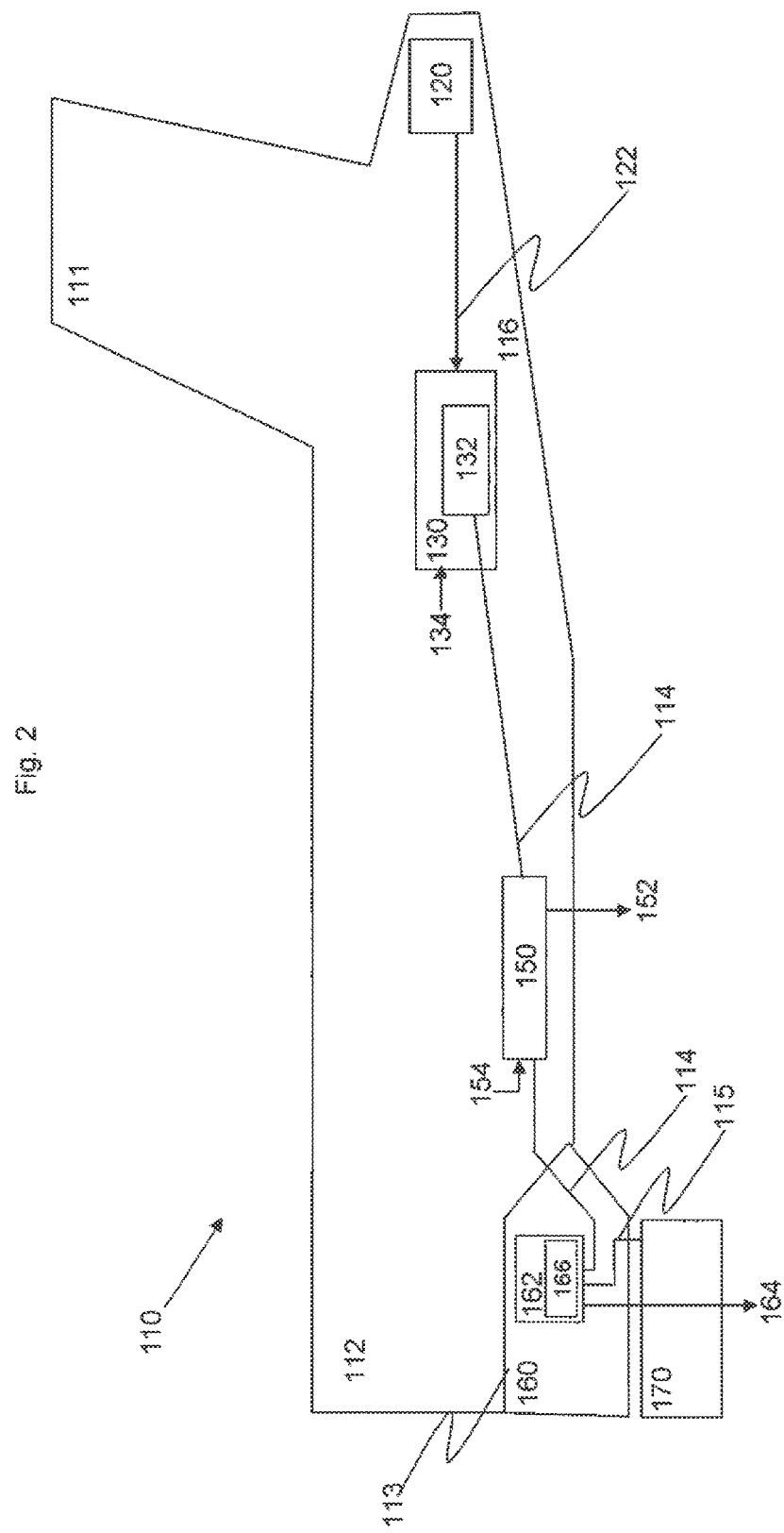

Aspects of the present invention will now be described, by way of example only, with reference to the accompanying drawings, in which:

FIG. 1 shows a schematic side elevation of the rear of an aircraft having an ODA conditioning apparatus in accordance with the third aspect of the present invention, FIG. 2 shows a schematic side elevation of the rear of an aircraft having an ODA conditioning apparatus in accordance with the fourth aspect of the present invention, and Table 1 (see below) describes the four cases of ambient conditioning that an aircraft will encounter and how the present invention functions to achieve drying of the ODA to reduce the prospect of ice in the fuel.

A section of a typical rear engined aircraft 10 (see FIG. 1) comprises a fuselage 12 and a tail cone 16, a vertical tail plane (VTP) 11 and a wing 13. Within the wing 13 is a main fuel tank 60 and a collector cell 62. An engine 70 is mounted at the rear of the aircraft, at the junction between the VTP 11, the tail cone 16 and the fuselage 12.

At the junction between the tail cone 16 and fuselage 12 is a primary heat exchanger 40. A dryer 50 is located in the fuselage, between the wing 13 and the primary heat exchanger 40.

Housed in the tail cone 16 is a hydrogen tank 20 and a hydrogen fuel cell 30. The hydrogen fuel cell 30 is located fore of hydrogen fuel tank 20. Within the hydrogen fuel cell 30 is a secondary heat exchanger, loft radiator 32.

The hydrogen fuel cell 30 is connected to the hydrogen fuel tank 20 by a hydrogen supply line 22. The hydrogen fuel cell 30 is also supplied with air via air inlet 34.

An ODA supply line 14, extends from the outlet of loft radiator 32 to the collector cell 62, via both the primary heat exchanger 40 and then the dryer 50.

A fuel line 15, extends from the collector cell 62 to the engine 70, via the primary heat exchanger 40.

Both the primary heat exchanger 40 and the dryer 50 feature water drains 42 and 52 respectively. The dryer also features an air inlet 54.

In operation, the hydrogen fuel cell 30 uses hydrogen from tank 20 and air from inlet 34 to generate electricity.

The exhaust from the hydrogen fuel cell 30 is hot, humid, oxygen depleted air (ODA). This, hot, humid, ODA is partially cooled by the loft radiator 32. The partially cooled ODA exits the loft radiator 32 via ODA supply line 14 and enters the primary heat exchanger 40, where it is further cooled, by the fuel from the collector cell 62. Any condensed water leaves the primary heat exchanger by the water drain 42. The fully cooled ODA exits the heat exchanger 40 via ODA supply line 14 and enters the dryer 50, where it is dried further, by feeding heated cabin air to the dryer 50 via the air inlet 54. The water drain 52 in the dryer 50 removes the excess water. The cooled and dried ODA exits the dryer 50 via the supply line 14 and enters the collector cell 62. The ODA is then bubbled through the fuel in the collector cell 62, where any remaining water in the ODA condenses in the fuel and either remains as a suspension in the fuel or sinks to the bottom of the collector cell 62. The cool, dry ODA is used to inert the fuel in the aircraft fuel tank 60.

That method is in accordance with the first aspect of the invention.

A section of a typical under-wing engined aircraft 110 (see FIG. 2) comprises fuselage 112 and a tail cone 116, a vertical tail plane (VTP) 111 and a wing 113. Within the wing 113 is a main fuel tank 160 and a collector cell 162. Within the collector cell 162 is a primary heat exchanger, condenser 166. An engine 170 is mounted under the wing 160.

Housed in the tail cone 116 is a hydrogen tank 120 and a hydrogen fuel cell 130. The hydrogen fuel cell 130 is located fore of hydrogen fuel tank 120. Within the hydrogen fuel cell 130 is a secondary heat exchanger, loft radiator 132.

The hydrogen fuel cell 130 is supplied with hydrogen from the hydrogen tank 120 by a supply line 122. The hydrogen fuel cell 130 is also supplied with air via air inlet 134.

Between the wing 113 and the hydrogen fuel cell 130, there is arranged, in the fuselage 112 a dryer 150.

An ODA supply line 114, extends from the loft radiator 132 to the collector cell 162, via the dryer 150.

A fuel line 115, extends from the collector cell 162 to the engine 170.

The fuel cell 130 functions as described above in relation to FIG. 1.

The exhaust from the hydrogen fuel cell 130 is hot, humid, oxygen depleted air (ODA). This, hot, humid, ODA is partially cooled by loft radiator 132. The partially cooled ODA exits the loft radiator 132 via ODA supply line 114 and enters the dryer 150, where it is dried, by feeding heated cabin air to enter the dryer 150 via the air inlet 154. A water drain 152 in the dryer 150 removes the excess water. The partially cooled and dried ODA exits the dryer via supply line 114 and enters the collector cell 162. The ODA is then bubbled through the fuel in the collector cell 162, where any remaining water in the ODA condenses in the fuel and either remains as a suspension in the fuel or sinks to the bottom of the collector cell 162. The cool, dry ODA is used to inert the fuel in the aircraft fuel tank 160.

In the case where the dryer 150 is not able to dry the ODA sufficiently (i.e. When descent or ground conditions are >10° C. and the ODA is >12° C.), then the humid ODA is passed to a condenser 166 embedded in the collector cell 162, where, if the fuel is cold, the water in the ODA condenses out and is automatically ejected though a drain 164. The residue dry ODA is then bubbled through the fuel in the collector cell 162 where it is used to inert the fuel in the aircraft fuel tank 160.

In the case where the ambient conditions are warm (>12° C.) so that wet ODA reaches the heat exchanger 150 and the fuel is also warm (>10° C.) then some water will accrue in the fuel in the collector cell fuel since the ODA is passing through it. In this case, where there is warm fuel and a warm environment, water represents no hazard so long as it is consumed prior to the aircraft fuel temperature descending below 0° C. The hotter the environment and fuel combination the more water will condense into the collector cell 162, but conversely the risk of icing reduces.

Any water coming out of suspension will normally drop to the bottom of the collector cell 162, as its specific gravity is higher that the fuel, where it will be scavenged direct to the pump inlet. In this case where there is a hot destination with hot fuel then icing is not a problem and the water has no negative effects on the engine. The collector cell only holds less than 30 minutes of fuel so all of that fuel (and water) will be consumed before the fuel temperature can drop below 0° C. Where the fuel is cold then this provides the necessary cooling and dehumidifying of the ODA, and hence dry ODA is put into the tanks.

Care must be taken not to overcool the ODA since fuel temperatures can approach −40 degrees C. and hence the heat exchanger could ice up. It may be necessary to providing supplementary heating within the heat exchanger or a temporary bypass to maintain the ODA between zero degrees Celsius and 12 degrees Celsius.

If an aircraft is laid up for an extended period following a hot landing with hot fuel which then cools down below 0° C. before the next flight then the water in the collector cell collects at the bottom of the heat exchanger where it is removed by the automatic water drain activity.

Aircraft operate from a variety of locations which have extremes of temperatures, from over 40 degrees Celsius on the ground, for example in Seville airport, in Spain, in the summer, to minus 60 degrees Celsius, for example, in Anadyr airport, in Russia, in the winter. It will be appreciated also that aircraft move relatively quickly from different environments, for example from cruising at 40,000 ft where the outside air temperature is commonly below minus 50 degrees Celsius to landing at an airport which most likely will be at a different, higher temperature. Given these temperature ranges, relatively quick transitions and the different thermic properties of the airframe and the fuel contained with its fuel tanks, the airframe and the fuel may often be at different temperatures. Columns A and B of the Table 1 show the state of the airframe and the fuel in terms of relative temperature.

For example an aircraft sitting on the ground at Anadyr airport in the depths of winter for an extended period of time will cool such that both the airframe and the fuel are cold as in row 1.

An aircraft just landed at Seville airport on a summer's day having completed the relatively short flight from a neighbouring airport experiencing similar weather conditions may have a cold airframe but hot fuel, as in row 2.

An aircraft landed at Seville airport slightly earlier, on the same day having completed a four hour cruise may have a hot airframe but cold fuel, given the higher heat capacity of the liquid kerosene to the aluminium airframe and their respective geometries, as in row 3.

An aircraft sitting on the ground at Seville airport on a summer's day for an extended period of time will heat up such that both the airframe and the fuel are hot as in row 4.

For these 4 cases the objective of cooling the ODA from a hydrogen fuel cell will be achieved slightly differently.

Exhaust ODA from a hydrogen fuel cell will be typically in the range of 80 to 90 degrees Celsius. Cooling when the aircraft is in flight can be achieved primarily through the addition of ram air.

For the first case, (row 1) conditioning of the exhaust ODA can utilise firstly loft radiators within the airframe, (using the airframe as a heat sink) and secondly a heat exchanger (using the fuel as a heat sink). In this way the ODA can be cooled to the optimum 0 to 12 degrees Celsius for the enthalpy drier.

For the second and third cases (rows 2 and 3) cooling is performed by either the loft radiators or the heat exchanger, and subsequently dried using the enthalpy drier.

For the fourth case (row 4) neither of loft radiator of the heat exchanger can cool the ODA to the optimum working range of the dryer, so it is likely that the ODA will not be fully dried. However, in this case wet ODA may be passed to the fuel tanks as icing is not an immediate issue due to the fuel temperature.

If the ODA is directed to the engine feed collector cells and bubbled through the fuel at this location then the water will transfer to the fuel and either stay as a suspended liquid, or coalesce at the bottom of the collector cell. In both cases the water is fed to the engines, in the case of fuel descending to the bottom of the tank it will be scavenged by jet pump suction devices powered by the fuel pump motive flow.

It should be noted that the output temperature of ODA from a typical dryer is in the range of 80 to 90 degrees Celsius Given that the maximum temperatures of the fuel and the airframe will not generally exceed 60 degrees Celsius, the fuel and airframe will always offer at least a limited cooling effect.

Although the description has concentrated on a method of conditioning oxygen depleted air (ODA) exhausting from a fuel cell on a civil aircraft, it should be obvious to those skilled in the art that the present invention could be applied to aircraft fulfilling a wide range of roles. The present invention is also scaleable so as to be equally useful for single aisle aircraft as wide body or twin aisle aircraft.

TABLE 1

| Row: | A<br>Airframe<br>State | B<br>Fuel State | C<br>Mode of Operation |
|---|---|---|---|
| 1 | Cold | Cold | Use primary and/or secondary heat exchanger |
| 2 | Cold | Warm | Use secondary heat exchanger, bypass primary heat exchanger |
| 3 | Warm | Cold | Use primary heat exchanger |
| 4 | Warm | Warm | Water from ODA acceptable in the collector cell as collector cell capacity is approximately 30 minutes of fuel burn, given present conditions any potential change in conditions will take longer than this to affect. |

The invention claimed is:

1. A method of conditioning oxygen depleted air (ODA) exhausted from a fuel cell comprising the steps of:
    taking fuel from a collector cell of an aircraft fuel tank,
    delivering said fuel to a rear mounted engine via a primary heat exchanger,
    taking exhaust ODA from the fuel cell,
    upon taking exhaust ODA from the fuel cell, passing the exhaust ODA through a secondary heat exchanger, to cool the ODA,
    passing the ODA from the secondary heat exchanger through the primary heat exchanger in the opposite direction to the fuel, such that the fuel acts as a heat sink for the ODA, to cool the ODA,
    passing the ODA through a dryer, to dry the ODA,
    the ODA passing through the fuel in the collector cell to transfer any water from the ODA to the fuel, and
    using the cooled, dried ODA to inert fuel in the aircraft fuel tank.

2. A method of conditioning oxygen depleted air (ODA) exhausted from a fuel cell comprising the steps of:
    taking exhaust ODA from a fuel cell,
    passing the ODA through a primary heat exchanger,
    the primary heat exchanger is located in a collector cell of an aircraft fuel tank,
    wherein the primary heat exchanger is a condenser,
    wherein the ODA passes through the fuel in the collector cell to transfer any water from the ODA to the fuel, and
    using the cooled, dried ODA to inert the fuel in the aircraft fuel tank.

3. A method of conditioning oxygen depleted air (ODA) exhausting from a fuel cell according to claim 2 comprising the further step of:
    before passing the ODA through the primary heat exchanger,
    passing the ODA through a dryer, to dry the ODA.

4. A method of conditioning oxygen depleted air (ODA) exhausting from a fuel cell according to claim 2 comprising the further step of:
    upon taking exhaust ODA from a fuel cell,
    passing the exhaust ODA through a secondary heat exchanger, to cool the ODA, and
    wherein the ODA is passed through the fuel in the collector cell to transfer any water from the ODA to the fuel.

5. A conditioning system for cooling and drying oxygen depleted air (ODA) exhausted from a fuel cell to be used in inerting fuel within an aircraft fuel tank, said conditioning system comprising:
    a collector cell in the aircraft fuel tank,
    an engine,
    a dryer, and
    a primary heat exchanger,
    said primary heat exchanger is located between the collector cell in the aircraft fuel tank and the engine,
    a secondary heat exchanger,
    said secondary heat exchanger is located between the fuel cell and the primary heat exchanger,
    a fuel line extending from the collector cell to the engine, passing through one side of the primary heat exchanger,
    an ODA line extending from the fuel cell to the fuel tank, passing through the secondary heat exchanger before passing through the other side of the primary heat exchanger so that fuel passing from the collector cell to the engine acts as a heat sink for the ODA, to cool the ODA,
    said dryer being located in the ODA line between the collector cell in the aircraft fuel tank and the primary heat exchanger, to dry the ODA.

6. The conditioning system of claim 5, wherein said secondary heat exchanger comprising a loft radiator using atmospheric conditions.

7. An aircraft having a fuel tank with an inerting system and a conditioning system for cooling and drying oxygen depleted air according to claim 5.

8. The aircraft of claim 7 in which at least one of the aircraft's engines is mounted at the rear of the aircraft.

9. The aircraft of claim 7 in which at least one of the aircraft's engines is mounted under the wings of the aircraft.

10. A conditioning system for cooling and drying oxygen depleted air (ODA) exhausted from a fuel cell to be used in inerting fuel within an aircraft fuel tank, said conditioning system comprising
    a collector cell in the aircraft fuel tank,
    an under-wing mounted engine,
    a primary heat exchanger,
    said primary heat exchanger is a condenser,
    said primary heat exchanger is located in the collector cell in the aircraft fuel tank,
    said primary heat exchanger being supplied by ODA exhausted from the fuel cell, the ODA is passed through the fuel in the collector cell to transfer any water from the ODA to the fuel, such that the aircraft fuel acts as a heat sink for the ODA, to cool and dry the ODA.

11. The conditioning system of claim 10 further comprising a dryer.

12. The conditioning system of claim 10 further comprising a secondary heat exchanger, said secondary heat exchanger comprising a loft radiator using atmospheric conditions.

* * * * *